United States Patent
Michels et al.

(10) Patent No.: US 12,189,124 B2
(45) Date of Patent: Jan. 7, 2025

(54) OPTICAL SYSTEM FOR GENERATING A VIRTUAL IMAGE AND METHOD FOR PRODUCING AN OUTPUT COUPLING ARRANGEMENT OF AN OPTICAL SYSTEM

(71) Applicant: tooz technologies GmbH, Aalen (DE)

(72) Inventors: Georg Michels, Aalen (DE); Momchil Davidkov, Aalen (DE)

(73) Assignee: tooz technologies GmbH, Aalen (DE)

( * ) Notice: Subject to any disclaimer, the term of this patent is extended or adjusted under 35 U.S.C. 154(b) by 588 days.

(21) Appl. No.: 17/416,336

(22) PCT Filed: Dec. 10, 2019

(86) PCT No.: PCT/EP2019/084425
§ 371 (c)(1),
(2) Date: Jun. 18, 2021

(87) PCT Pub. No.: WO2020/126672
PCT Pub. Date: Jun. 25, 2020

(65) Prior Publication Data
US 2022/0082834 A1 Mar. 17, 2022

(30) Foreign Application Priority Data
Dec. 21, 2018 (DE) .......................... 102018133383.8

(51) Int. Cl.
*G02B 27/01* (2006.01)
*F21V 8/00* (2006.01)

(52) U.S. Cl.
CPC ....... *G02B 27/0172* (2013.01); *G02B 6/0045* (2013.01); *G02B 6/0053* (2013.01); *G02B 6/0055* (2013.01)

(58) Field of Classification Search
None
See application file for complete search history.

(56) References Cited

U.S. PATENT DOCUMENTS

2015/0036223 A1 2/2015 Dobschal et al.
2016/0349512 A1* 12/2016 Menke ............... G02B 27/0172
(Continued)

FOREIGN PATENT DOCUMENTS

| CN | 204758854 U | 11/2015 |
| DE | 102016105060 B3 | 7/2017 |

(Continued)

OTHER PUBLICATIONS

International Preliminary Report on Patentability rendered by the International Bureau of WIPO for PCT/EP2019/084425, dated Jun. 16, 2021, 6 pages.
Office Action to corresponding Japanese Patent Application No. 2021-534925 rendered by the Japan Patent Office (JPO) on Mar. 5, 2024, 9 pages (including English translation).
Office Action to corresponding European Patent Application No. 19 829 429.0 rendered by the European Patent Office (EPO) on Sep. 28, 2023, 13 pages (including English translation).
(Continued)

*Primary Examiner* — Bao-Luan Q Le
*Assistant Examiner* — Danell L Owens
(74) *Attorney, Agent, or Firm* — Skaar Ulbrich Macari, P.A.

(57) ABSTRACT

An optical system for generating a virtual image of a source image provided on an image generator includes a surface of an output coupling that is exposed to a light beam path that is surface-treated such that the light beam path is coupled out from an optical waveguide toward the eye from first partial regions of the surface of the output coupling. In second partial regions of the surface of the output coupling, said second partial regions being different from the first partial regions, said light beam path is coupled out from the optical waveguide toward the eye at most with reduced intensity, or not at all.

12 Claims, 4 Drawing Sheets

(56) References Cited

U.S. PATENT DOCUMENTS

2016/0363769 A1    12/2016   Masuda et al.
2017/0045745 A1     2/2017   Piskunov et al.
2018/0252941 A1*   9/2018   Dobschal ............ G02B 27/0172

FOREIGN PATENT DOCUMENTS

| JP | 2012123147 A | * | 6/2012 |
|----|--------------|---|--------|
| JP | 2016110080 A |   | 6/2016 |
| JP | 2017142406 A |   | 8/2017 |
| WO | 2016102190 A1 |  | 6/2016 |
| WO | 2017219433 A1 |  | 12/2017 |

OTHER PUBLICATIONS

Office Action to corresponding Japanese Patent Application No. 2021-534925 rendered by the Japanese Patent Office (JPO) on Nov. 14, 2023, 8 pages (including English translation).
International Search Report rendered by the International Bureau of WIPO for PCT/EP2019/084425, dated Mar. 30, 2020, 2 pages.
Office Action to corresponding Chinese Patent Application rendered by the China National Intellectual Property Administration on Jun. 14, 2024, 12 pages (including English translation).
Office Action to corresponding Korean Patent Application rendered by the Korean Intellectual Property Office (KIPO) on Oct. 11, 2024, 16 pages (including English translation).

* cited by examiner

OPTICAL SYSTEM FOR GENERATING A VIRTUAL IMAGE AND METHOD FOR PRODUCING AN OUTPUT COUPLING ARRANGEMENT OF AN OPTICAL SYSTEM

PRIORITY

This application claims the priority of German patent application DE 10 2018 133 383.8, filed Dec. 21, 2018, which is hereby incorporated herein by reference in its entirety.

FIELD

The invention relates to an optical system for generating a virtual image of a source image provided on an imager, in accordance with the preamble of patent claim 1.

Further, the invention relates to a method for producing an output coupling arrangement of such an optical system.

BACKGROUND

An optical system of the type set forth at the outset is known from the document WO 2016/102190 A1.

An optical system of the type set forth at the outset can be used in a so-called head-mounted display (HMD), i.e., a display apparatus that is worn on the head. One conventional form of HMDs uses screens that are worn in front of the eyes and present the user with computer-generated images or images taken by cameras. Such HMDs are often voluminous and do not allow direct perception of the surroundings. It is only relatively recently that HMDs have been developed which are able to present the user with an image recorded by a camera or a computer-generated image without preventing direct perception of the surroundings. Such HMDs, which are also referred to as smartglasses, allow for this technology to be used in everyday life.

Optical systems of such smartglasses typically have an imager, an input coupling element, a light guide, and an output coupling element. Input coupling of light originating from the source image into the light guide and output coupling of the light propagating in the light guide from the light guide can be realized using different approaches, for example on the basis of reflection, refraction, diffraction, holography, etc., or a combination thereof. Smartglasses are distinguished by high demands on the imaging quality while having a relatively large imaging ratio. At the same time, the emphasis in the case of such headworn systems lies in a low weight and compactness (small installation space), demanding imaging of the source image for generating the virtual image using as few optical surfaces as possible, as a result of which, in turn, only a few surfaces are available for compensating optical aberrations, however. Not least, perfect sight through smartglasses (so-called see-through functionality) is one of the important criteria that decide the acceptance and success of HMD products.

In the case of the optical systems in which the output coupling of the light propagating in the light guide is realized by way of a reflection at a free-form Fresnel surface with one (e.g., free-form mirror) or more segments, as described in the document set forth at the outset, the optical imaging quality depends very strongly on the surface trueness and quality of the output coupling arrangement on account of the relative position of the output coupling arrangement close to the exit pupil of the optical system and to the pupil of the eye of the user. Local shape deviations of the individual Fresnel segments lead to a significant reduction in the optical performance, expressed in loss of contrast, double images (ghost images), and other imaging aberrations. Moreover, connection conditions apply between the individual segments of the Fresnel surface, which should be understood as a continuously continuable pieces of a freeform surface, said connection conditions requiring a tolerance in respect of shape deviations, but also in respect of the mutual relative position, i.e., position relative to one another, of the individual Fresnel segments in the sub micrometer range ($\ll 1$ µm) so that an acceptable imaging quality can be attained. Maintaining a very small tolerance range in respect of trueness to shape and mutual alignment of the Fresnel segments was found be very difficult and complicated in practice, particularly when manufacturing plastics parts, as a result of the properties of the plastics such as thermal expansion, compressibility, internal stresses, surface adhesion, etc., and the manufacturing technology and processes used, such as injection molding, injection compression molding, etc. However, maintaining a very small tolerance range has a direct effect on the yield of good parts, and represents a great challenge, both from a technology and process point of view.

To ensure the aforementioned see-through functionality (transparency) of the light guide in the region of the output coupling arrangement, it is advantageous to provide the output coupling arrangement with a partly transparent layer which reflects some of the luminous intensity of the light beam path coming from the imager but which has properties making it is transparent as possible in the direction of the gaze passing therethrough, and consequently represents a compromise between the best possible transparency and maximum intensity of the light output coupled toward the eye of the user. Moreover, the output coupling arrangement is usually applied to a second shell. The latter can be matched to the shape of the output coupling arrangement in the region of the output coupling arrangement. The shell is affixed to the light guide by means of an adhesive or in any other way. The grooves of the output coupling arrangement can also be filled with another transparent substance, for example adhesive, without the use of a shell. A shell whose surface facing the adhesive has anti-adhesion properties, either inherently or after an appropriate treatment, could be used for shaping only during the curing process and could be removed thereafter.

A further problem with the use of partly transparent layers, which are however of decisive importance for the see-through function, consists in the light which is partly transmitted through one Fresnel segment being incident in the shadowed region of the subsequent Fresnel segment and reaching the eye of the observer following a single reflection or multiple reflections. Here, there is an infringement of the continuity condition in the general case if the output coupling arrangement has a free-form Fresnel surface. Since the emphasis lies in optimizing the reflecting region of the Fresnel segments when designing the Fresnel surface, imaging aberrations arise during the passage through the Fresnel edges and when the light beam path is incident in the shadowed regions of the Fresnel segments where the light beam path is reflected. The effect is further amplified by deviations from the target geometry due to the manufacturing process, for example rounding of the segments on account of the radius of the diamond tool, for example during ultra-precise processing. The light components arisen thus, which reach the eye of the user, lead to a loss of contrast, double images, smearing of the perceived image, and further unwanted effects, which in total have a negative effect on the imaging quality of the optical system.

JP 2016-110080 A likewise discloses an optical system according to the preamble of claim 1. The output coupling arrangement has a plurality of areas that are inclined relative to one another, the areas thereof on which light rays propagating in the optical waveguide are incident directly are partly provided with a reflecting layer.

SUMMARY

The invention is therefore based on the object of developing an optical system of the type set forth at the outset, to the effect of improving its imaging quality.

Moreover, the invention is based on the object of providing a method for producing an improved output coupling arrangement.

According to certain embodiments of the invention, the object is achieved in respect of the optical system set forth at the outset by virtue of the area of the output coupling arrangement impinged by the light beam path having been surface-treated in such a way that the light beam path is output coupled from the light guide to the eye from first portions of the area of the output coupling arrangement which are predefined for imaging the source image while said light beam path is not output coupled, or at best output coupled with a reduced intensity, from the light guide to the eye in second portions of the area of the output coupling arrangement which differ from the first portions.

The optical system according to certain embodiments of the invention deviates from the concept of providing the entire area of the output coupling arrangement with partial mirroring such that the entire area of the output coupling arrangement impinged by the light beam path output couples the light beam path from the light guide to the eye. By contrast, in the system according to certain embodiments of the invention, the light beam path is only taken from portions of the area of the output coupling arrangement impinged by the light beam path, which are selected in a targeted manner, for the purposes of output coupling the light beam path to the eye of the user. To this end, the area of the output coupling arrangement impinged by the light beam path is surface-treated in such a way that the light beam path is merely output coupled from the light guide to the eye from predefined first portions of the area of the output coupling arrangement while said light beam path is not output coupled, or at best output coupled with a reduced intensity, from the light guide to the eye of the user in second portions of the area impinged by the light beam path. Here, a reduced intensity should be understood to be relative to the intensity of the light beam path output coupled in the first portions, and so low intensity output coupling in the second portions does not noticeably impair the quality of the virtual image generated in the. The first portions of the area of the output coupling arrangement are selected or determined in view of an optimal imaging quality of the optical system.

In particular, the first portions are those portions of the area of the output coupling arrangement which satisfy defined minimum requirements in respect of surface quality, trueness to shape, and other parameters relevant to the imaging quality. The first portions can be ascertained by way of suitable measurement methods. By way of an example, suitable measurement methods include conventional method measures for tactile and contactless shape measurement, such as profilometry, white light interferometry, chromatic-confocal measurement methods, for example.

Loss of contrast, double images, smearing of the perceived image, and further unwanted effects as a result of output coupling light components, which do not actually contribute to the imaging, of the light coming from the source image into the eye of the user are avoided, or at least reduced, using the optical system according to certain embodiments of the invention.

The first portions of the area of the output coupling arrangement impinged by the light beam path, which serve to output couple the light beam path from the light guide, can be surface treated by virtue of being provided with a reflecting layer. In this context, a reflecting layer should also be understood to mean a partly reflecting layer. Accordingly, the reflecting layer can have a reflectivity ranging from 1% to 100%. Moreover, a reflecting layer should also be understood to mean a layer which is constructed from a plurality of individual layers. According to certain embodiments of the invention, the individual output coupling areas in the case of an output coupling arrangement consisting of a plurality of output coupling areas can have different surface treatments. This likewise applies to portions of different output coupling areas and portions of one and the same output coupling area. In particular, the first portions can be surface treated with reflecting layers whose reflectivity differs by at least 0.1%.

In contrast to conventional systems, the reflecting layer is not applied to the entire area of the output coupling arrangement but only in the selected portions of the area (first portions).

The second portions not provided with the reflecting layer consequently do not contribute, or only contribute to a reduced extent, to the output coupling of the light beam path from the light guide. Moreover, as a result of coating the area of the output coupling arrangement only in the first portions, the transparency (see-through function) of the light guide is increased in the region of the output coupling arrangement since the non-coated second portions have the maximum possible transmission. The reduction in the intensity of the light beam path coupled out of the light guide on account of the area of the output coupling arrangement not being provided with reflecting layer everywhere can be achieved by increasing the luminosity of the imager or by coating the first portions with a higher reflectivity.

As an alternative to or cumulatively with a surface treatment of the first portions with reflecting layer, the second portions of the area of the output coupling arrangement, from where the light beam path should not be output coupled, or at best be output coupled with a reduced intensity, from the light guide to the eye of the user, can be surface-coated with a layer that is transparent in the visible spectrum and ideally refractive index matched, wherein the refractive index-matched layer in the second portions at least reduces a reflection of the light beam path to the eye of the user and/or brings about an output coupling of the light beam path from the light guide in a direction away from the eye.

This measure also advantageously contributes to an increase in the imaging quality of the optical system by virtue of those portions of the area of the output coupling arrangement which lead to loss of contrast, double images, or any other deterioration in the imaging quality if the light beam path is output coupled to the eye of the user from the light guide thereby have a reduced reflectivity in relation to the first portions on account of the refractive index-matched layer and/or promote an increased transmission of the light beam path for output coupling the light beam path in the direction away from the only the user.

The refractive index-matched layer is preferably highly transparent in the visible spectrum. The refractive index is matched to the material of light guide and/or output coupling arrangement in such a way that a refractive index jump, which gives rise to reflections, is as small as possible in the second portions of the area of the output coupling arrangement.

A refractive index-matched layer should also be understood to mean a layer which, for example in the case of a Fresnel-segmented surface, has arisen by filling the grooves with the refractive-index matched material.

The output coupling arrangement can have an area with one or more Fresnel segments. In particular, the Fresnel surface can be a free-form Fresnel surface with one or more segments.

In the case where the output coupling arrangement is configured with a plurality of Fresnel segments, the first portions of the area of the output coupling arrangement, which should be used for the desired output coupling of the light beam path to the eye of the user, in each case are a region located outside of a shadow cast by an adjacent Fresnel segment.

As already described at the outset, imaging aberrations may arise when the light beam path passes through the Fresnel edges and light penetrates into the shadowed regions of the Fresnel segments. However, if the regions of the long edges of the Fresnel segments located outside of the respective cast shadow are at least partly selected as the first portions, as provided by the above-mentioned measurement, such that the light beam path is only output coupled from the light guide in the first portions, the components of the light beam path which reach into the shadowed regions of the Fresnel segments can no longer lead to imaging aberrations since these components of the light beam path are not output coupled, or at best output coupled with a reduced intensity, from the light guide.

The second portions, in which output coupling of the light beam path from the light guide in the direction toward the eye of the user is reduced or suppressed, can each be a region of a Fresnel segment located within a shadow cast by an adjacent Fresnel segment and/or, in general, can each be a region which is not suitable for output coupling of the light beam path to the eye of the user because it does not meet the requirements in respect of an optimum imaging quality.

Moreover, a method for producing an output coupling arrangement, for example of an optical system according to certain embodiments of the invention, is provided according to the invention. According to certain embodiments of the invention, the method includes:
determining first portions of the area of the output coupling arrangement which are suitable for output coupling a light beam path, which comes from the source image and propagates in the light guide, from the light guide toward the eye of a user for the purposes of imaging the source image, surface-treating the area of the output coupling arrangement in such a way that the light beam path is output coupled out of the light guide to the eye of the user from the first portions while said light beam path is not output coupled, or at best output coupled with a reduced intensity, from the light guide to the eye in second portions of the area of the output coupling arrangement which differ from the first portions.

The first portions can be determined using a suitable optical measurement method, as specified in exemplary fashion above.

The method according to the invention has the same advantages as described in relation to the optical system according to the invention.

In preferred configurations, surface-treating the area of the output coupling arrangement can include an application of a reflecting layer on the first portions.

Advantageously, the surface treatment can be carried out by means of a mask in this case, said mask masking the portions of the area of the output coupling arrangement that should not be coated when the reflected layer is applied. After determining the first portions, such a coating mask can be manufactured in, e.g., a laser cutting method, an etching method, or any other method. The mask advantageously ensures the application of the reflecting coating only on the desired first portions of the area of the output coupling arrangement.

As an alternative thereto or cumulatively therewith, surface-treating the area of the output coupling arrangement can include an application of a refractive index-matched layer on the second portions.

Further advantages and features are evident from the following description and the attached drawing.

It goes without saying that the aforementioned features and those yet to be explained below can be used not only in the respectively specified combination but also in other combinations or on their own, without departing from the scope of the present invention.

BRIEF DESCRIPTION OF THE DRAWINGS

Exemplary embodiments of the invention are illustrated in the drawing and described in more detail below with reference thereto. In detail.

Figure 1:
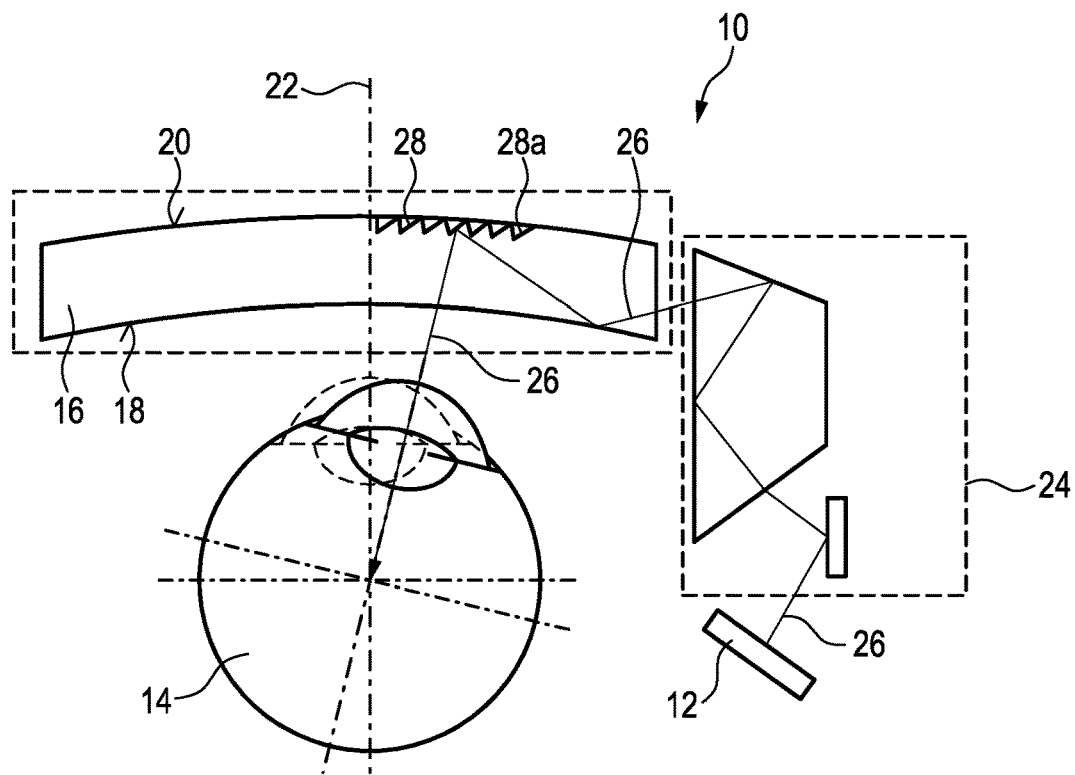
FIG. 1 shows a view from above of an exemplary embodiment of an optical system for generating a virtual image.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

FIG. 1 shows an optical system, provided with the general reference sign 10, for generating a virtual image of a source image provided on an imager 12. The optical system 10 can be the optical system of a head-mounted display (HMD), more particularly of smartglasses. In particular, the optical system 10 is able to present the source image, which is provided by the imager 12 and which may be a camera-recorded image or a computer-generated image, to the user without preventing the direct perception of the surroundings. This means that the optical system 10 allows the user to simultaneously gaze therethrough like in the case of conventional spectacles (so-called see-through functionality). Such systems are also referred to as augmented-reality glasses or virtual-reality glasses.

The optical system 10 comprises at least one light guide 16 to be worn in front of an eye 14 of the user. The light guide 16 can be embodied as a spectacle lens or can be integrated in a spectacle lens. FIG. 1 shows only one light guide 16, wherein the system 10 may have a second light guide (not shown), which is worn in front of the other eye of the user. It is furthermore understood that the light guide 16 can be constructed from the stacked arrangement of a plurality of light guides, as may be the case in such systems in order, for example, to use one respective light guide as a transmission channel for one respective spectral range.

The light guide 16 has an inner surface 18 facing the eye 14 and an outer surface 20 facing away from the eye. The light guide 16 is transparent to visible light such that the user can gaze through the light guide 16 in the direction of a viewing axis 22.

The optical system 10 furthermore comprises an input coupling arrangement 24 which serves to input couple a light beam path 26 emanating from the source image of the imager 12 into the light guide 16 between the inner surface 18 and the outer surface 20. The input coupling arrangement 24 and the light guide 16 can have a monolithic embodiment, i.e., no interface and hence no air gap is present between the input coupling arrangement 24 and the light guide 16. In addition to input coupling the light beam path 26 emanating from the imager 12 into the light guide 16, the input coupling arrangement 24 also serves to collimate the divergent light beam path 26 emanating from the imager 12.

In the light guide 16, the light beam path 26 that has been coupled into the light guide 16 via the input coupling arrangement 24 propagates by way of reflection at the inner surface 18 and the outer surface 20. In this case, the reflection of the light beam path 26 is based on total internal reflection of the light beam path 26 at the inner surface 18 and at the outer surface 20 of the light guide 16. The light beam path 16 propagates to the output coupling arrangement 28 in the light guide 16 after one or more reflections at the inner surface 18 and/or the outer surface 20 (for simplification purposes, FIG. 1 only shows one reflection at the inner surface 18). The function of the output coupling arrangement 28 is that of output coupling the light beam path 26 from the light guide 16 to the eye 14 of the user, as a result of which the user can perceive a virtual image of the source image imaged by way of the system 10.

The optical imaging quality of the generated virtual image depends very strongly on the surface trueness and surface quality of the output coupling arrangement 28 on account of the relative position of the output coupling arrangement 28 close to the exit pupil of the optical system and the pupil of the eye 14.

In the exemplary embodiment shown, the output coupling arrangement 28 is embodied as a free-form Fresnel surface with a plurality of Fresnel segments 28a, which have a sawtooth-type embodiment. Seven segments are shown in FIG. 1 in exemplary fashion. The Fresnel segments are oriented in such a way that a zero ray of the light beam path 26 incident on the respective Fresnel segment (facet) 28a is reflected in the direction of the inner surface 18 of the light guide 16, from where it enters the eye 14 of the user. Light beams incident in the output coupling arrangement 28 from the surroundings through the outer surface 20 are passed by said output coupling arrangement to the greatest possible extent in order thus to give the user of the optical system 10 the impression that the virtual image generated from the source image of the imager 12 floats in the surroundings.

Figure 1A:
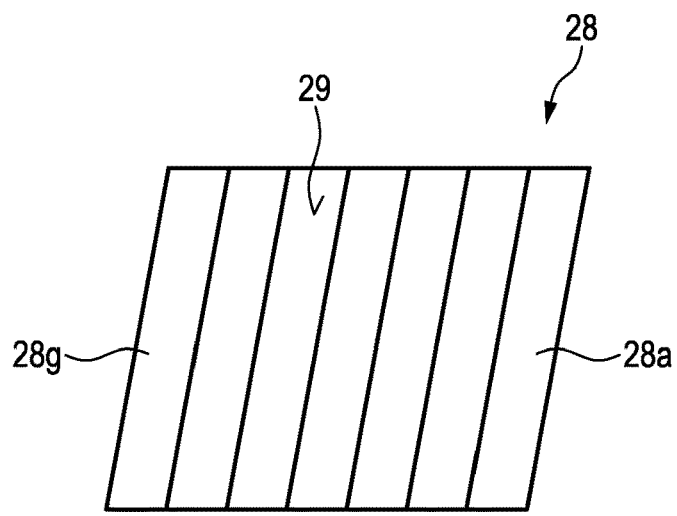
FIG. 1A shows a plan view of the output coupling arrangement of FIG. 1.

FIG. 1A shows a plan view of the entire area 29 of the output coupling arrangement 28 on its own and with an increased scale in relation to FIG. 1. In the example shown, the output coupling arrangement 28 has seven Fresnel segments 28a-28g. The Fresnel segments 28a-28g form the area 29 of the output coupling arrangement 28 which is impinged by the light beam path 26 propagating in the light guide 16 from the input coupling arrangement 24 to the output coupling arrangement 28. In the case of conventional optical systems, the entire area 29, as illustrated in FIG. 1A, for example, is used to output couple the light beam path 26 into the eye 14 of the user. However, this has disadvantages in respect of the imaging quality of the optical system 10, which are expressed in loss of contrast, in the generation of double images (ghost images), and in other aberrations. This is explained below in exemplary fashion with reference to FIG. 2. In a special case, the area 29 of the output coupling arrangement 28 can consist of a single Fresnel segment.

Figure 2:
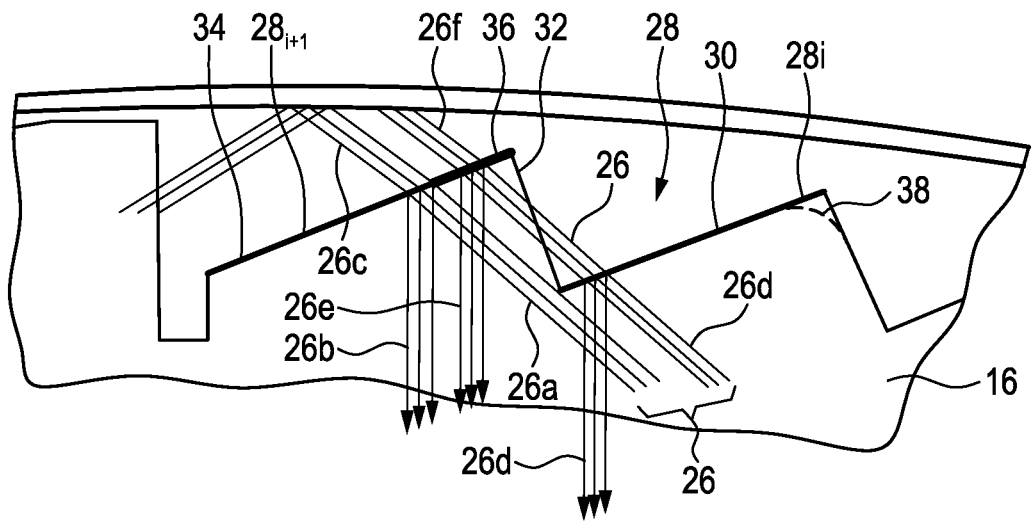
FIG. 2 shows a section of the optical system to explain how stray light arises in the region of an output coupling arrangement in the system.

FIG. 2 shows a section of the light guide 16 in the region of the output coupling arrangement 28, of which two successive Fresnel segments $28_i$ and $28_{i+1}$ are shown. Furthermore, FIG. 2 shows the light beam path 26 which propagates in the light guide 16. A light beam of the light beam path 26, which is denoted by 26a, passes the Fresnel segment $28_i$, strikes a long edge 34 of the Fresnel segment $28_{i+1}$ and partly reflects from there on account of the partial transparency the output coupling arrangement 28, as shown by a light beam 26b, and partly enters the Fresnel segment $28_{i+1}$, as shown by light beam 26c. The light beam 26b is accordingly output coupled from the light guide 16 in the direction of the eye of the user (not shown here) by the Fresnel segment $28_{i+1}$. The light beam 26b is a target light beam, which is required and used for imaging the source image for the purposes of generating a virtual image in the eye of the user. FIG. 2 furthermore shows a light beam 26d of the light beam path 26 which, in contrast to the light beam 26a, initially passes through the Fresnel segment $28_i$, more precisely through a long edge 30 and a short edge 32 of the same, and which, following the passage therethrough, is incident on the long edge 34 of the Fresnel segment $28_{i+1}$. From there, it is partly reflected, as indicated by a light beam 26e, and partly transmitted, as indicated by a light beam 26f. The light beam 26d is incident on the Fresnel segment $28_{i+1}$ in a region 36 of the same, which actually is located in the shadow of the Fresnel segment $28_i$. The light beam 26e which is reflected in the shadowed region 36 and output coupled from the light guide 16 into the eye of the user by the Fresnel segment $28_{i+1}$ represents extraneous or stray light, which does not contribute to the proper imaging of the source image for the purposes of generating a virtual image but, instead, interferes with the imaging quality as a result of generating a double image. The fact that the light beam 26e cannot contribute to proper imaging is due to, inter alia, it having experienced an additional passage through the Fresnel segment $28_i$. Moreover, multiple reflections which reduce the imaging quality may occur during the passage through the edges 30 and 32. Additionally, the imaging quality may deteriorate even further if, on account of manufacturing tolerances, the Fresnel segments $28_i$ and $28_{i+1}$ deviate from the target geometry, for example as a result of a rounding of the Fresnel segments $28_i$, as indicated by a dashed line 38 in the Fresnel segment $28_i$. Such geometric errors lead to a further deterioration in the imaging quality.

When designing the imaging parameters of the output coupling arrangement, a passage of the light beam path 26 through the edges of the segments and a subsequent output coupling to the eye 14 of the user typically remains unconsidered and is therefore unwanted. On the other hand, a certain transparency of the output coupling arrangement is required for the see-through function.

To avoid the aforementioned problems, provision is made according to the invention for the area 29 of the output coupling arrangement 28 impinged by the light beam path 26, as shown in FIG. 1A, for example, not to be (partly) mirrored in its entirety like in the prior art such that the light beam path 26 is output coupled from the light guide 16 over the entire area 29 of the output coupling arrangement 28 but to be (partly) mirrored only in regions in predetermined portions of the area 29. This is achieved by virtue of the fact that the area of the output coupling arrangement 28 impinged by the light beam path 26 has been surface-treated in predetermined regions in such a way that the light beam path 26 is output coupled from the light guide 16 to the eye 14 from first portions of the area 29 of the output coupling arrangement impinged by the light beam path 26 while the light beam path 26 is not output coupled, or at best output coupled with a reduced intensity, from the light guide 16 to the eye 14 in second portions of the area 29 of the output coupling arrangement impinged by the light beam path which differ from the first portions. This is described below with reference to FIGS. 3 to 7.

Figure 3:
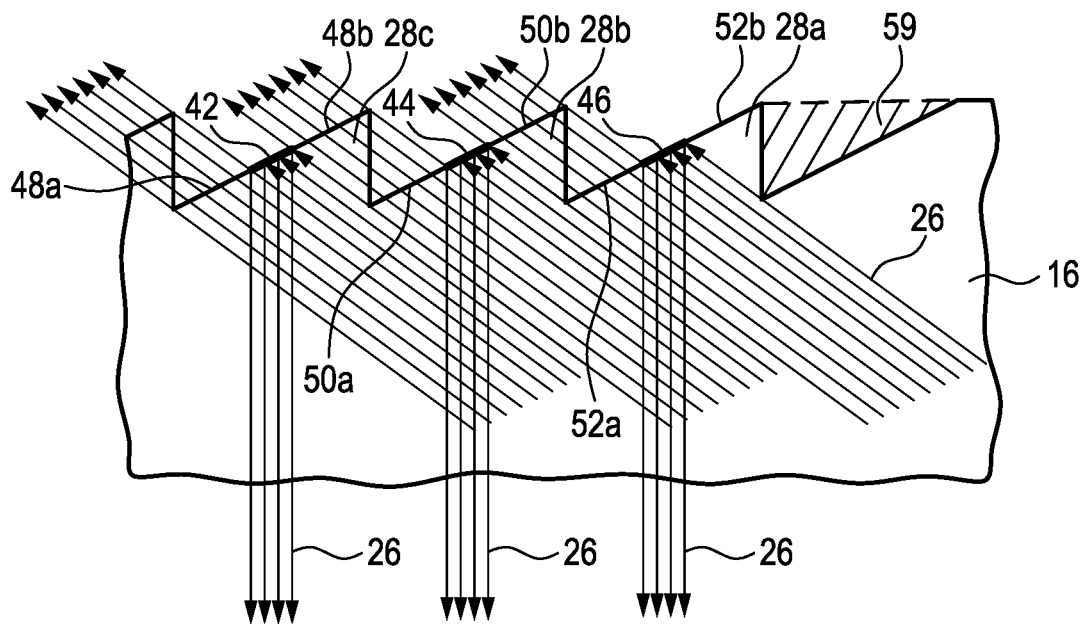
FIG. 3 shows a section of an optical system for generating a virtual image according to the principles of the present invention.
Figure 4:
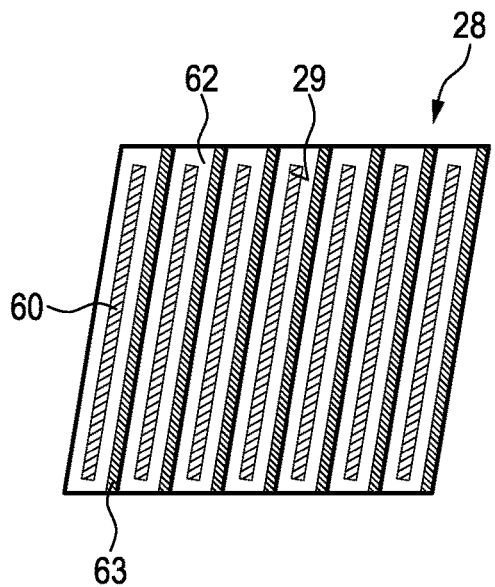
FIGS. 4-7 show examples of areas of output coupling arrangements that have been surface-treated in regions.

FIG. 3 shows an exemplary embodiment in which the light beam path 26 is output coupled from the light guide 16 toward the eye 14 of the user (see FIG. 1) merely via first portions 42, 44, 46 of Fresnel segments 28a, b and c, three being illustrated here, while the light beam path 26 is not output coupled from the light guide 16 toward the eye 14 of the user in second portions 48a, 48b (Fresnel segment 28c), 50a, 50b (Fresnel segment 28b) and 52a, 52c (Fresnel segment 28a). To this end, the first portions 42, 44, 46 are provided with reflecting layers, which can have a reflectivity ranging from 1% to 100%. The first portions 42, 44, 46 can differ in terms of the applied layers, in particular in respect of their reflectivity values. The first portions 42, 44, 46 have been determined on the basis of a preceding measurement process, which comprises a suitable measurement method. The first portions 42, 44, 46 are ascertained on the basis of the minimum requirements in respect of surface quality, trueness to shape, and other parameters relevant to the imaging quality. By way of an example, suitable measurement methods include conventional method measures for tactile and contactless shape measurement, such as profilometry, white light interferometry, chromatic-confocal measurement methods, for example.

By contrast, the second portions 48a, 48b, 50a, 50b, 52a and 52b are not provided with a reflecting layer. It is understood that a reflecting layer should be understood to mean not only an individual layer but also a layer structure made of a plurality of individual layers.

In addition or as an alternative to the application of a reflecting layer to the first portions 42, 44, 46, the second portions 48a, 48b, 50a, 50b, 52a, 52b can be provided with a refractive index-matched layer, which, in the second portions, at least reduces a reflection of the light beam path 26 toward the eye 14 and/or brings about output coupling of the light beam path 26 from the light guide 16 in the direction away from the eye, as indicated in FIG. 3 by light beams 26t.

The refractive index-matched layer in the second portions can also be formed by virtue of the Fresnel segments 28a, b, c being filled with a transparent refractive index-matched material on their side facing away from the eye 14, as indicated for a segment adjacent to the Fresnel segment 28 by way of a hatched region 59.

As shown in FIG. 3, the first portions 42, 44, 46 each are a region of the respective long edge of the Fresnel segments 28a, 28b, 28c which is located outside of the respective shadowed region (see shadowed region 36 in FIG. 2 or shadowed regions 63, for example in FIG. 4) of an adjacent Fresnel segment.

By contrast, the shadowed regions of the Fresnel segments are not provided with the reflecting layer but form the second portions 48b, 50b, 52b.

Figure 5:
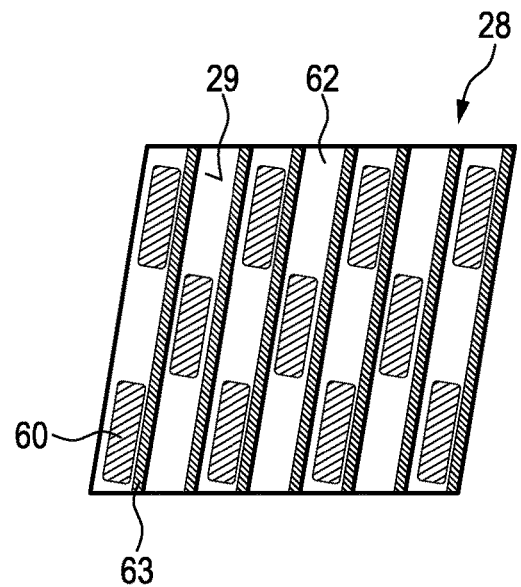
Figure 6:
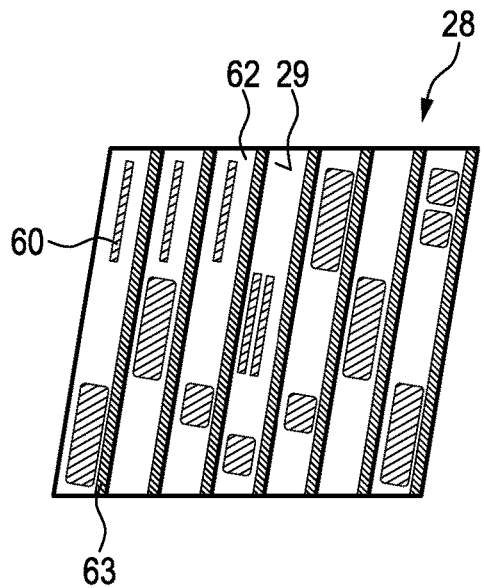
Figure 7:
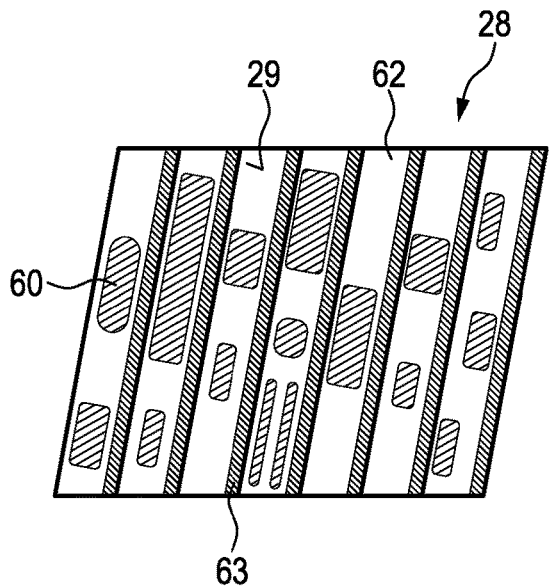

FIGS. 4 to 7 show exemplary embodiments of the area 29 of the output coupling arrangement 28 impinged by the light beam path 26, with selectively reflectively coated first portions 60 and not reflectively coated second portions 62. In FIGS. 4 to 7, the first portions 60 of the area of the output coupling arrangement 28, at which the light beam path 26 is output coupled toward the eye 14 of the user, are indicated by hatched fields. In particular, the hatched fields can all have different coatings or can in part have different coatings. The second portions 62 are indicated by white areas. The exemplary embodiment in FIG. 4 corresponds to the exemplary embodiment in FIG. 3 in a two-dimensional representation. FIGS. 5 to 7 show alternative exemplary embodiments of first portions, at which the light beam path 26 is output coupled toward the eye 14 of the user. As described above, a reflecting layer can be present in the first portions. In the remaining portions shown in white (second portions) of the area of the output coupling arrangement 28, there is no output coupling of the light beam path 26 toward the eye 14 of the user. In these regions, light components of the light beam path 26 can be rendered harmless, in particular by transmission or output coupling in the direction away from the eye 14 of the user such that no extraneous or stray light reaches the eye 14 of the user from these second portions. In FIGS. 4 to 7, shadowed regions of adjacent Fresnel segments are likewise illustrated with hatching and provided with reference sign 63.

Figure 8:
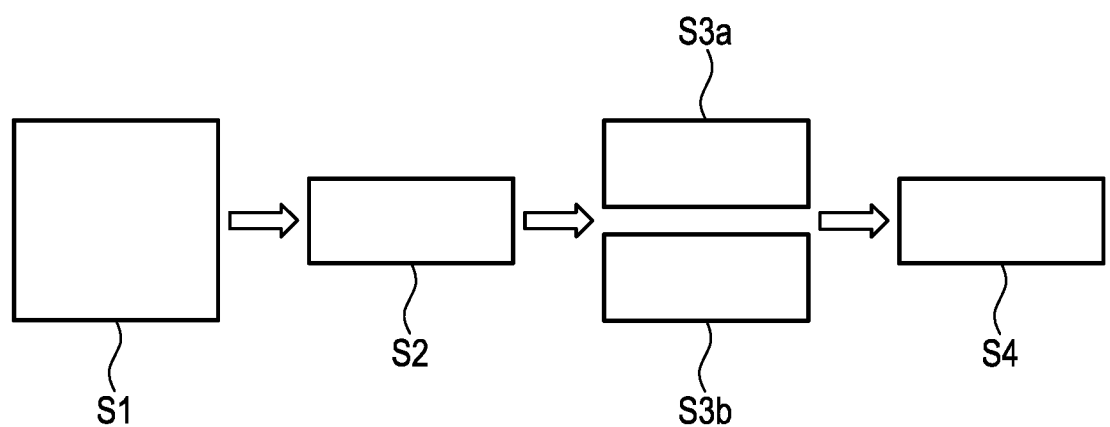
FIG. 8 shows a flowchart of a method for producing an output coupling arrangement of an optical system for generating a virtual image.

FIG. 8 shows a method for producing an output coupling arrangement 28 in a flowchart.

The area 29 of the output coupling arrangement 28 is measured and/or suitable patterns are recorded in step S1. The first portions of the area of the output coupling arrangement 28 which are suitable for output coupling the light beam path 26 from the light guide 16 in the direction of the eye for the purposes of imaging the source image are determined in a step S2. The first portions can be determined using suitable measurement methods, as specified above in exemplary fashion. A mask is produced in a step S3a, for example within the scope of a laser cutting method, etching method, or any other method. As an alternative to or cumulatively with step S3a, local adhesion conditions for subsequent coating of the first portions are established in a step S3b. The first portions of the area 29 determined in step S2 are provided with a reflecting layer in a step S4.

In addition or as an alternative thereto, the step S2 can comprise a determination of second portions which are not suitable for output coupling the light beam path 26 from the light guide 16 toward the eye 14 of the user. In the step S4, the second portions can be provided with a refractive index-matched layer, which reduces or prevents the reflection of the light beam path 26 at the second portions and/or which promotes output coupling of the light beam path 26 in the direction away from the eye 14 of the user. To this end, the segments can be filled on the outer side with a transparent material as described above. In this case, the refractive index-matched layer can also cover the reflecting coating of the first portions 42, 44, 46, 60.

It is understood that the present invention is not restricted to the configuration of the output coupling arrangement 28 with Fresnel segments but that it is also applicable to non-segmented output coupling arrangements, be these reflective, diffractive, or refractive output coupling optical units. Portions of the area the output coupling arrangement impinged by the light beam path 26 are also determined in the case of non-segmented output coupling arrangements and the surface treatment of the area, as described above, brings about output coupling of the light beam path 16 toward the eye 14 of the user only in the determined portions.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

The invention claimed is:

1. An optical system for generating a virtual image of a source image provided on an imager, comprising:
    a light guide that can be worn in front of an eye;
    an input coupling that couples a light beam path originating from the source image into the light guide; and
    an output coupling that couples the light beam path out of the light guide toward the eye,
    wherein the input coupling is configured to couple the light beam path into the light guide such that the light beam path propagates within the light guide by way of reflections at an inner and/or outer surface of the light guide to the output coupling,
    wherein the output coupling has an area that is impinged by the light beam path propagating in the light guide to the output coupling,
    wherein the area of the output coupling impinged by the light beam path comprises a surface that has been treated such that the light beam path is output coupled from the light guide to the eye from first portions of the area of the output coupling, the first portions satisfying minimum requirements in respect of the surface quality for imaging the source image, while said light beam path is not output coupled or is output coupled with a reduced intensity that does not noticeably impair a quality of the source image imaging, from the light guide to the eye in second portions of the area of the output coupling which differ from the first portions.

2. The system of claim 1, when the first portions have been surface-treated with a reflecting layer.

3. The system of claim 2, wherein the reflecting layer has a reflectivity ranging from 1% to 100%.

4. The system of claim 1, wherein the first portions have been surface-treated with reflecting layers, the reflectivity values of which differ by at least 0.1%.

5. The system of claim 1, wherein the second portions have been surface-treated with a refractive index-matched layer, the refractive index-matched layer in the second portions at least reducing a reflection of the light beam path toward the eye sufficient to not noticeably impair the quality of the source image imaging and/or to bring bringing-about output coupling of the light beam path from the light guide in a direction away from the eye.

6. The system of claim 1, wherein the first portions are defined via shape measurement of the surface of the area of the output coupling.

7. The system of claim 1, wherein each of the first portions is a region of a Fresnel segment that is located outside of a shadow cast by an adjacent Fresnel segment.

8. The system of claim 1, wherein each of the second portions is at least a region of a Fresnel segment that is located within a shadow cast by an adjacent Fresnel segment.

9. A method for producing an output coupling of an optical system that comprises Fresnel segments and produces a virtual image of a source image provided on an imager, the method comprising:
    determining first portions of an area of the output coupling that satisfy minimum requirements in respect of a surface quality of the area for output coupling a light beam path, which comes from a source image and propagates in a light guide, from the light guide toward an eye of a user for the purposes of imaging the source image;
    surface-treating the area of the output coupling such that the light beam path is output coupled out of the light guide to the eye of the user from first portions, while the light beam path is not output coupled, or is output coupled with a reduced intensity that does not noticeably impair a quality of the source image imaging, from the light guide to the eye in second portions of the area of the output coupling which differ from the first portions.

10. The method of claim 9, wherein surface-treating the area of the output coupling includes applying a reflecting layer on the first portions.

11. The method of claim 10, wherein the surface treatment is carried out using a mask which masks the second portions while the reflecting layer is applied.

12. The method of claim 9, wherein surface-treating the area of the output coupling includes an application of a refractive index-matched layer on the second portions.

* * * * *